United States Patent
Kuwaki et al.

(10) Patent No.: US 6,635,697 B2
(45) Date of Patent: Oct. 21, 2003

(54) FLAME-RETARDANT AND FLAME-RETARDING RESIN COMPOSITION

(75) Inventors: Tetsuo Kuwaki, Tokuyama (JP); Yasunobu Nakamura, Tokuyama (JP); Yasuhiro Muneuchi, Tokuyama (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 80 days.

(21) Appl. No.: 09/768,186

(22) Filed: Jan. 24, 2001

(65) Prior Publication Data

US 2002/0040083 A1 Apr. 4, 2002

(30) Foreign Application Priority Data

| Jan. 26, 2000 | (JP) | 2000-017503 |
| Feb. 4, 2000 | (JP) | 2000-027109 |
| Aug. 18, 2000 | (JP) | 2000-248849 |

(51) Int. Cl.$^7$ .................. C08L 5/3432; C08L 3/32

(52) U.S. Cl. ............ 524/100; 524/122; 524/123; 524/415; 524/416

(58) Field of Search .................. 524/100, 91, 96, 524/415, 416, 101, 123, 127

(56) References Cited

U.S. PATENT DOCUMENTS 5,210,120 A * 5/1993 Cipolli et al. ............... 524/100

* cited by examiner

*Primary Examiner*—Robert Harlan
(74) *Attorney, Agent, or Firm*—Armstrong, Westerman & Hattori, LLP

(57) ABSTRACT

The present invention provides a flame-retardant which is not only excellent in flame-retarding property but also devoid of lowering moisture-resisting property specially in the course of molding of a resin so that the flame-retardant has little limitation for the molding method, the molding conditions and the intended use thereof. What is characterized is a flame-retardant comprising (a) an aliphatic amine salt of a phosphoric ester with 2–25 carbon atoms in the ester moiety thereof having a melting point of at least 100° C. but not more than a molding temperature of a thermoplastic resin and (b) a salt of phosphoric and/or polyphosphoric acid, the proportion of the component (a) to the component (b), i.e. (a)/(b) being 1/2–5/1 by weight ratio. In case a polyolefin resin is incorporated with this flame-retardant, the resultant resin composition achieves such an outstanding merits that the composition is not only excellent in flame-retarding property but also devoid of lowering moisture-resisting property especially in the course of molding of the resin composition so that the composition has little limitation for the molding method, the molding conditions and the intended use thereof.

10 Claims, No Drawings

FLAME-RETARDANT AND FLAME-RETARDING RESIN COMPOSITION

BACKGROUND OF THE INVENTION

1. Field of the Invention

The present invention relates to a flame-retardant as well as a flame-retarding resin composition incorporated with the flame-retardant. More particularly, it relates to a non-halogen type flame-retardant and a flame-retarding resin composition possessing excellent flame retarding property and being capable of stably exhibiting an outstanding moisture-resisting property.

2. Description of the Prior Art

From the past, various flame-retarding treatments are applied on actual use of a thermoplastic resin for preventing or suppressing fire, and a range of the application is still being spread even now. In general, a variety of flame-retardants have been incorporated into thermoplastic resins for making themselves flame-retardative. The flame-retardants are roughly classified into a halogen type flame-retardant and a non-halogen type flame-retardant.

With respect to the halogen type flame-retardant, toxicity of acidic gas such as hydrogen chloride or hydrogen bromide generated on combustion of the retardant is pointed out from the past. In recent years, moreover, fear of generating extremely toxic dioxin has come into question. Consequently, the non-halogen type flame-retardant now attracts public attention.

The non-halogen type flame-retardant is roughly classified into an endothermic flame-retardant and an adiabatic film-forming flame-retardant. Mentioned as the endothermic flame-retardant are metal hydroxides such as magnesium hydroxide and aluminum hydroxide. As compared with the halogen type flame-retardant, the endothermic flame-retardant is weak in toxicity of a gas evolved at the time of burning but it has to be incorporated in a larger amount into a resinous material such as polyolefin for exhibiting satisfactory flame-retarding effect, thus causing a problem such as deterioration of physical properties of the resin used.

On the other hand, mentioned as the adiabatic film-forming flame-retrdant are a glass film-forming flame-retardant such as a low melting point glass or a silicone and a char-forming flame-retardant containing red phosphorus, a phosphoric ester, an amine salt of phosphoric acid and/or a salt of polyphosphoric acid as an effective ingredient.

For practical use, however, the aforesaid adiabatic film-forming flame-retardant involves a problem to be solved. For example, the low melting point glass and the silicone are not satisfactory in flame-retarding property so that the sort of resins is thus limited, while red phosphorus evolves a toxic gas such as phosphine during combustion for producing char. Further, the phosphoric ester is poor in flame-retarding property and low in melting point, thus creating a problem in molding of a resin used.

Contrary to this, a certain degree of flame-retarding property can be expected in the amine salt of phosphoric acid and the salt of polyphosphoric acid so that these are watched as a non-halogen type flame-retardant.

As the salt of phosphoric acid is inferior in moisture-resisting property, however, a resin composition incorporated therewith involves a problem such that when mixed with a hygroscopic filler, the retardant adheres to a screw or the like parts due to heated steam thereby deteriorating moldability of the resin, or alternatively, the retardant tend to bleed out on the surface of the resultant moldings due to moisture in atmosphere thereby giving rise to a problem of whitening on the surface of the moldings.

Under the aforesaid circumstances, several methods have been proposed for improving moisture-resisting property of the salt of phosphoric acid. For example, a method for preparing ammonium type II crystalline polyphosphate excellent in moisture-resisting property is proposed in Japanese Patent Publn. No. Sho. 60-6885 and a method for improving moisture-resisting property by providing a melamine coating on ammonium polyphosphate is proposed in Japanese Laid-open Patent Appln. No. Hei. 6-263416.

Problem to be Solved by the Invention

However, the flame-retardant thus treated tends to lose moisture-resisting property partially on account of destroy of a water-repellent film, i.e. the melamine layer due to internal shear in the course of melt-kneading and molding. Accordingly, there is a space for improving defect during the molding process and for preventing whitening of the resulting moldings.

It is an object of the present invention to provide a flame-retardant comprising a specific aliphatic amine salt of phosphoric ester and a salt of phosphoric and/or polyphosphoric acid in a specific proportion and being capable of exhibiting excellent flame-retarding property and stable moisture-resisting property.

It is another object of the present invention to provide a flame-retarding resin composition which comprises a thermoplastic resin incorporated with the aforesaid flame-retardant in a specific proportion and is furnished with excellent flame-retarding property jointly with stable moisture-resisting property.

Means for Solving the Problem

As a result of the extensive research made by the present inventors for solving the problem above mentioned, it has now been found surprisingly that conjoint use of a specific aliphatic amine salt of a phosphoric ester with a salt of phosphoric and/or polyphosphoric acid as a flame-retardant ingredients in a specific proportion exhibits excellent flame-retarding effect and that a thermoplastic resin incorporated with the flame-retardant in a specific proportion exhibits excellent flame-retarding property in combination with moisture-resisting property in the course of molding of the resin. The present invention has been accomplished on the basis of the above finding.

SUMMARY OF THE INVENTION

In accordance with the present invention, there is provided a flame-retardant which comprises (a) an aliphatic amine salt of a phosphoric ester with 2–25 carbon atoms in the ester moiety thereof having a melting point of at least 100° C. but not more than a molding temperature of a thermoplastic resin to be used and (b) a salt of phosphoric and/or polyphosphoric acid, the proportion of the component (a) to the component (b), i.e. (a)/(b) being 1/2–5/1 by weight ratio.

In accordance with the present invention, there is also provided a flame-retarding resin composition which comprises 100 parts by weight of a thermoplastic resin incorporated with 15–150 parts by weight of the aforesaid flame-retardant.

As one embodiment of the flame-retarding composition, there may be given a composition which comprises 100 parts by weight of a thermoplastic resin incorporated with (a) 10–100 parts by weight of an aliphatic amine salt of a phosphoric ester with 2–25 carbon atoms in the ester moiety having a melting point of at least 100° C. but not more than shaping temperature of the thermoplastic resin and (b) 5–50 parts by weight of a salt of phosphoric and/or polyphosphoric acid, the proportion of the component (a) to the component (b), i.e. (a)/(b) being 1/2–5/1 by weight ratio.

DETAILED DESCRIPTION OF THE PREFERRED EMBODIMENTS OF THE INVENTION

As to the salts of phosphoric and/or polyphosphoric acid utilizable for the component (b) of the flame-retardant of the present invention, any of the known salts employed as flame-retardant can be used without limitation. Above all, salts of phosphoric acid and/or polyphosphoric acid with a metal of the Groups IA–IVB of the Periodic Table, ammonia, an aliphatic amine and an aromatic amine is preferable. Illustrative of the typical salt are, for example, metal salts such as lithium, sodium, calcium, barium, iron (ferrous and ferric), and aluminum salts; ammonium salt; aliphatic amine salts such as methylamine, ethylamine, diethylamine, triethylamine, ethylenediamine, and piperazine salts; and aromatic amine salts such as pyridine, triazine and melamine salts.

In the flame-retardant of the present invention, the salts of phosphoric and/or polyphosphoric acid permit the formation of polyphosphoric acid on burning to promote carbonization of polyolefin so that they function to form a protective film on the surface of the resin composition. Among the foregoing salts, aliphatic amine salts of phosphoric acid or ammonium polyphosphate are particularly excellent in protective film-forming ability and are especially preferred in the present invention. Above all, ammonium polyphosphate serves, in combination with an aliphatic amine salt of a phosphoric ester, to afford flame-retarding polyolefin possessing more excellent flame-retarding property and moisture-resisting property, and is thus most preferred.

In the present invention, the salts of phosphoric acid and the salts of polyphosphoric acid can freely be used singly or in combination of at least two. In addition, the salts of phosphoric acid and the salts of polyphosphoric acid may be coated on the surface thereof with melamine to enhance moisture-resisting property for a longer period of time.

The aliphatic amine salt per se of a phosphoric ester used in the flame-retardant of the present invention functions as a flame-retardant and moreover imparts moisture-resisting property to the aforesaid salts of phosphoric acid and the salts of polyphosphoric acid, so that the flame-retardant of the present invention enables to enhance moisture-resisting property of a flame-retarding rein composition incorporated with the flame-retardant without any deterioration of the flame-retarding property.

In the flame-retardant of the present invention, it is of importance for displaying the above function that the aliphatic amine salt of a phosphoric ester has 2–25 carbon atoms in the ester moiety and a melting point of at least 100° C. but lower than a molding temperature of a thermoplastic resin used. By the term "shaping temperature" used herein is literally meant the temperature needed for molding a thermoplastic resin used, and is properly determined by the sort of the thermoplastic resin used and the mode of the molding method. As will be described hereinafter, polyolefin type resin is preferable as the thermoplastic resin used for this purpose. On the other hand, the melting point of the aliphatic amine salt of a phosphoric ester is preferably at least 170° C. but not more than 250° C., and more preferably at lest 170° C. but not more than 230° C.

In case the melting point of the aliphatic amine salt of a phosphoric ester exceeds the molding temperature of the resin, the resultant flame-retarding rein composition fails to exhibit good moisture-resisting property. This fact is supposed to be ascribable to the reason that the aliphatic amine salt of a phosphoric ester is not molten at the time of melt molding the composition, thus resulting in failing to form a moisture-resisting film on the salts of phosphoric acid and/or polyphosphoric acid.

Contrary to this, the fact that the flame-retardant in which the aliphatic amine salt of a phosphoric ester has a melting point lower than the molding temperature of the composition exhibits good moisture-resisting property is presumed to be ascribable to the reason that the aliphatic amine salt of a phosphoric ester is molten at the time of melt molding the composition and is effectively coated on the salts of phosphoric and/or polyphosphoric acid inferior in moisture-resisting property, lest the moisture-resisting film thus formed should be destroyed during molding process.

As described above, a preferable molding temperature is properly determined by the sort of resin and the mode of molding process. In case of polyolefin resin, for example, a preferable range of the molding temperature of polypropylene resin is 190–250° C. while that of polyethylene resin is 170–220° C. Accordingly, it is recommendable to determine the molding temperature previously and then to select the aliphatic amine salt of a phosphoric ester satisfying the above condition. The molding temperature can actually be measured in an extruder with any type of the resin thermometer such as radiation type or contact type. For example, it is general that a resin temperature is measured by a resin thermometer annexed to an extruder.

If the melting temperature of the aliphatic amine salt of a phosphoric ester is lower than 100° C., the timing of melting polyolefin is too fast so that dispersion of the salt into the polyolefin become poor, or the salt is bled out on the surface of the moldings to permit whitening, or the salt causes dripping in a combustion test, and simultaneously flame-retarding property is deteriorated. Further, stain of metal molds takes place on molding or a problem arises in rough surface of the moldings.

The aliphatic amine salt of a phosphoric ester having a melting point higher than 170° C. within the aforementioned preferable range can effectively prevent the above problems and concurrently exhibits good moisture-resisting property of the composition on molding.

The aliphatic amine salt of a phosphoric ester used in the present invention is a salt of a known phosphoric ester comprised of a phosphoric monoester and/or diester with an aliphatic amine.

In the phosphoric ester, it is of importance that a total number of carbon atoms in the ester group of one molecular phosphoric ester is 2–25. In the event the number of carbon atoms is less than 2, the moisture-resisting property is unsatisfactory, while the flame-retarding property is unsatisfactory if the number of carbon atoms exceeds 25. From the viewpoint of enhancing moisture-resisting property, it is preferred that the number of carbon atoms is 6–25. A hydrocarbon group in the ester moiety can be chosen at need from aliphatic hydrocarbons and aromatic hydrocarbons. Illustrative of the hydrocarbon in the ester moiety are, for example, an aliphatic hydrocarbon such as hexyl or octyl and an aromatic hydrocarbon such as phenyl, tolyl, or naphthyl.

In case an aromatic phosphoric ester is used as the phosphoric ester, the ester bond is higher in hydrolysisresisting property, thus making the aromatic ester preferable. The term "aromatic phosphoric ester" means herein an aromatic phosphoric acid monoester or an aromatic phosphoric acid diester (referred to hereinafter simply as the aromatic phosphoric (mono- or di-)ester, which is an aryl ester of orthophosphoric acid carrying one or two ester bonds per phosphorus atom. Concretely illustrative of the aromatic phosphoric ester are, for example, monoaryl ester of phosphoric acid such as monophenyl phosphate, monotolyl phosphate, mono-tert-butylphenyl phosphate or mono (nitrophenyl) phosphate; diaryl ester of phosphoric acid such as diphenyl phosphate, ditolyl phosphate, di- tert-butylphenyl phosphate or di(nitrophenyl) phosphate. As the aromatic phosphoric ester, a phosphoric monoester is preferable which is excellent in flame-retarding property. Further, monophenyl phosphate or monotolyl phosphate, especially monotolyl phosphate is preferable.

On the other hand, concretely illustrative of aliphatic amine are a primary monoamine such as ethylamine, ethanolamine; a primary polyamine such as 1,3-diaminopropane or ethylenediamine; a secondary monoamine such as diethylamine; a secondary polyamine such as piperazine; tertiary monoamine such as triethylamine; a tertiary polyamine such as triethylenediamine or N,N,N',N'-tetramethylethylenediamine; and a primary to tertiary composite amine such as diethylenetriamine, triethylenetetramine or N,N-dimethylethylenediamine.

Above all, a secondary polyamine or a tertiary polyamine is extremely preferable as its salt with an aromatic phosphoric ester affords a flame-retardant which is excellent in flame-retarding property and is capable of obtaining a flame-retarding resin composition superior in heat-resisting and moisture-resisting properties. Among these amines, a secondary polyamine, especially piperazine is preferred.

No special limitation exists in the proportion of the aromatic phosphoric ester to the aliphatic amine, which constitute the aliphatic amine salt of the aromatic phosphoric ester. However, a salt wherein an acid equivalent of the aromatic phosphoric ester is equal to a base equivalent of the aliphatic amine is preferable since it affords a flame-retarding resin composition excellent in moisture-resisting property.

Among the aliphatic amine salts of the aromatic phosphoric esters, an aliphatic amine salt of an aromatic phosphoric monoester is preferable since this salt can afford a flame-retarding resin composition possessing more excellent flame-retarding property. In addition, an aliphatic amine salt of monophenyl phosphate or monotolyl phosphate is preferable. Among these salts, the aliphatic amine is a secondary polyamine, especially piperazine is particularly preferable as its salt can afford a flame-retardant for resins which can be used to obtain a flame-retarding resin composition excellent in both heat-resisting and moisture-resisting properties. A salt of equimolar piperazine and monotolyl phosphate (a salt in which the acid equivalent is equal to the base equivalent) is especially preferred since this salt affords a flame-retardant which can be used to obtain a flame-retarding resin composition especially remarkable flame-retarding property, heat-resisting property ad moisture-resisting property.

In the present invention, the aliphatic amine salt of the aromatic phosphoric ester is obtained according to a process wherein the aromatic phosphoric (mono- or di-)ester and the aliphatic amine each prepared according to a general method are mixed directly or in an adequate solvent to form the salt.

Mentioned as a method for preparing the aromatic phosphoric ester, for example, the aromatic phosphoric monoester is a method wherein phosphorus pentoxide is reacted with a hydroxyhydrocarbon [H. Alder and W. H. Woodstock, Chem. Industries, 51, 516 (1942)], thereby preparing the aromatic phosphoric monoester. It is preferable that the aromatic phosphoric monoester and the aliphatic amine are mixed together each as a 5–50% aqueous solution. An aqueous solution of the aromatic phosphoric monoester prepared according to the aforesaid method may contain the corresponding diester and pyrophosphoric diester as by-products in addition to the main product, the phosphoric monoester, but it is no matter to use the mixture directly as it is. The salt in which an acid equivalent of the aromatic phosphoric ester is equal to a base equivalent of the aliphatic amine is obtained by mixing an aqueous solution of the aromatic phosphoric monoester with an aqueous solution of the aliphatic amine, and washing the formed precipitate with water.

The formation of this salt can be confirmed by a high magnetic field shift of $^{31}$P-NMR of the aromatic phosphoric (mono- or di-)ester and a low magnetic field shift of $^1$H-MNR of hydrogen atom in α-position of the aliphatic amine.

Taking the formation of a salt between monophenyl phosphate and piperazine as an example, a result of the $^{31}$P-NMR measurement revealed that the chemical shift 1.79 ppm of the monophenyl phosphate was shifted to a high magnetic field of the chemical shift 6.88 ppm after the formation of the salt, while a result of the $^1$H-NMR measurement revealed that the chemical shift 2.82 of the methylene in the piperazine was shifted to a low magnetic field of 3.50 ppm after the formation of 3.50 ppm. This apparently showed a result that the phosphoric acid was converted into phosphate anion while the piperazine was converted into piperazinium cation, corroborating that a salt of monophenyl phosphate and piperazine was formed.

In the present invention, the aforesaid flame-retardant for resins which is the aliphatic amine salt of the aromatic phosphoric ester may comprised of one or at least two aliphatic amine salts of aromatic phosphoric esters.

A proportion of the aliphatic amine salt of the phosphoric ester [the component (a)] to a salt of phosphoric acid and/or polyphosphoric acid [the component (b)] used in the present invention, i.e. the ratio (a)/(b) is 1/2–5/1, preferably 1/2–3/1, more preferably 1/1–2/1 by weight ratio. If the proportion is less than 1/2, the moisture-resisting property of a flame-retarding resin composition will be deteriorated. If the proportion is larger than 5/1, the flame-retarding property will be deteriorated.

It is preferable to incorporate the flame-retardant of the present invention comprised of the aliphatic amine salt of a phosphoric ester and a salt of phosphoric and/or polyphosphoric acid with an additional nitrogen-containing compound having a triazine skeleton [the component (c)]. The flame-retarding property of the flame-retardant can be enhanced by incorporating it with the aforesaid nitrogen-containing compound having a triazine skeleton (c) so that amount of the flame-retardant used can be reduced thereby maintaining the properties of a thermoplastic resin as a base material.

The flame-retardant of the present invention exhibits high flame-retarding effect by the formation of a carbonized film of a thermoplastic resin due to a carbonization-promoting action of the aliphatic amine salt of a phosphoric ester and the salt of phosphoric and/or polyphosphoric acid. The effect of this film is more enhanced with bubbling of a decomposition gas by additionally incorporating the nitrogen-containing compound having a triazine skeleton, thus showing more excellent flame-retarding property. Accordingly, a total amount of the flame-retardant used can be reduced to maintain mechanical properties and moisture-resisting property owned by a thermoplastic resin.

In accordance with the present invention, there is further provided a flame-retardant of the aforesaid formulation and further incorporated with the nitrogen-containing compound having a triazine skeleton.

Below is an explanation on the nitrogen-containing compound having a triazine skeleton.

A nitrogen-containing heterocyclic compound having a triazine skeleton represented by the following general formula and a salt thereof can be used without any limitation as the nitrogen-containing compound having a triazine skeleton for the present invention:

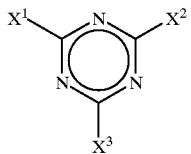

wherein $X^1$, $X^2$ and $X^3$ are the same or different and each stands for hydrogen, an alkyl group, an aryl group, an amino group, hydroxyl group or an alkoxy group.

In the above general formula, the alkyl group has preferably 1–4 carbon atoms and includes methyl group, ethyl group, propyl group, and butyl group; the aryl group has preferably 6–10 carbon atoms and includes phenyl group, tolyl group, xylyl group, and naphthyl group; and the alkoxy group has preferably 1–4 carbon atoms and includes methoxy group, ethoxy group, propoxy group, and butoxy group.

More specifically mentioned are triazine, melamine, benzoguanamine, methyl-guanamine, cyanuric acid, trimethyltriazine, triphenyltriazine, diaminomethyl-triazine, diaminophenyltriazine, diaminoisopropoxytriazine and the like nitrogen-containing heterocyclic compounds and their salts with inorganic acids.

Salts of the nitrogen-containing heterocyclic compound having a triazine skeleton represented by the above general formula with inorganic acids, such as phosphate, and sulfate thereof, especially melamine salts with inorganic polybasic acids such as melamine phosphate and melamine sulfate are particularly preferable since a flame-retarding resin composition possessing more excellent flame-retarding property and moisture-resisting property can be obtained when these salts are used as the nitrogen-containing compound having a triazine skeleton in the flame-retardant of the present invention. In view of flame-retarding property, melamine phosphate is especially preferable.

As a technical effect achieved by the addition of the nitrogen-containing compound having a triazine skeleton, it is presumed by the present inventors that the compound is decomposed on combustion whereupon a thermoplastic resin composition is foamed by the decomposed gas to increase adiabatic effect of carbonized film formed with promotion by the aliphatic amine salt of a phosphoric ester and a salt of phosphoric and/or polyphosphoric acid and concurrently inert gas evolved serves to increase the distance between the oxidation reaction site and the resin composition thereby inhibiting pyrolysis of the resin composition.

In the present invention, the proportion of the nitrogen-containing compound having a triazine skeleton is 10–100 parts by weight, preferably 20–80 parts by weight based on 100 parts by weight of a total amount of the aliphatic amine salt of a phosphoric ester and a salt of phosphoric and/or polyphosphoric acid. So far as the proportion of the nitrogen-containing compound having a triazine skeleton is within the aforesaid range, the resultant flame-retarding resin composition incorporated with the flame-retardant is much more excellent in flame-retarding property and well maintains moisture-resisting property, heat-resisting property and mechanical properties.

The flame-retardant of the present invention is incorporated into various thermoplastic resin for making the resin easily flame-retardative.

Any of the known thermoplastic resin is used without any special limitation for mixing with the flame-retardant. Examples of the resin include, for example, thermoplastic resins such as polyolefin resin, polystyrene resin, polyvinyl resin, polyamide resin, polyester resin, polycarbonate resin, polyether resin, and and other various modified resins.

Illustrative of the polyolefin resin are a homopolymer of an α-olefin such as ethylene, propylene, butene, pentene, hexene, 4-methylpentene or octene; and a copolymer of at least two α-olefins. Typical examples of the polyolefin resin include polypropylene resins such as propylene homopolymer, propylene-ethylene random copolymer, propylene-ethylene block copolymer, and propylene-ethylene-butene copolymer; and polyethylene resins such as low density polyethylene, high density polyethylene, and ethylene-α-olefin random copolymer.

Illustrative of the polystyrene resin are, for example, polystyrene, acrylonitrile-styrene copolymer (AS), and acrylonitrile-butadiene-styrene copolymer (ABS).

Illustrative of the polyvinyl polymer are, for example, a homopolymer of a vinyl monomer such as an alkyl acrylate, an alkyl methacrylate, vinyl acetate, or vinyl alcohol; and a copolymer of the vinyl monomer and the aforesaid α-olefin.

Illustrative of the polyamide resin are, for example, nylon 6 and nylon 66. Examples of the polyester resin include, for example, polyalkene terephthalates such as polyethylene terephthalate (PET) and polybutylene terephthalate (PBT); polyalkene adipates; polylactone; and polyhydroxycarbonate.

Further, examples of the polycarbonate resin include, for example, resins constituting an aromatic carbonic ester as a construction unit such as poly-4,4'-dioxyphenol-2,2-propane carbonate, while examples of the polyether resins include polyphenylene ether and polyethylene ether.

These thermoplastic resins may be in the form of either plastomer or elastomer. Mentioned as the elastomer are, for example, an ethylene-propylene-butadiene copolymer, a styrene-butadiene copolymer (SBR), a nitrile-butadiene copolymer (NBR), polybutadiene, and polyisoprene.

These thermoplastic resins may be used singly or as a mixture of at least two. In addition, modified substances of the thermoplastic resins, for example, modified products obtained by grafting the thermoplastic resins with an unsaturated carboxylic acid such as acrylic acid, methacrylic acid, maleic acid, fumaric acid, maleic anhydride or itaconic anhydride, or a siloxane can be used.

Among the aforesaid thermoplastic resins, polyolefin resins are preferable for the reason that they are popular and afford moldings excellent in chemicals-resisting and flame-retarding properties. In the present invention, polypropylene resins such as propylene homopolymer, propylene-ethylene random copolymer, and propylene-ethylene block copolymer are especially preferred since a flame-retarding resin compositions obtained by using these resins afford moldings excellent in moldability, mechanical strength, heat-resisting property, appearance and cost performance.

In case the thermoplastic resin is incorporated with the flame-retardant in the present invention, 100 parts by weight of the thermoplastic resin is preferably incorporated with 15–150 parts by weight of the flame-retardant which comprises (a) 10–100 parts by weight of the aliphatic amine salt of a phosphoric ester, (b) 5–50 parts by weight of a salt of phosphoric and/or polyphosphoric acid, the proportion of the component (a) to the component (b), i.e. (a)/(b) being 1/2–5/1 by weight ratio. In case the proportion is within the above range, the flame-retarding resin composition is warranted to possess satisfactory flame-retarding property, moisture-resisting property, moldability, and impact-resistance.

In case the thermoplastic resin is incorporated with the flame-retardant comprised of the aliphatic amine salt of a phosphoric ester (a), a salt of phosphoric and/or polyphosphoric acid (b) and the nitrogen-containing compound having a triazine skeleton (c), 100 parts by weight of the thermoplastic resin is preferably incorporated with 20–100 parts by weight of the flame-retardant which comprises (a) 10–100 parts by weight of the aliphatic amine salt of a phosphoric ester, (b) 5–50 parts by weight of a salt of phosphoric and/or polyphosphoric acid and (c) 5–50 parts by weight of the nitrogen-containing compound having a triazine skeleton, the proportion of the component (a) to the component (b), i.e. (a)/(b) being 1/2–5/1 by weight ratio. In case the proportion is within the aforesaid range, the flame-retarding resin composition is much more excellent in flame-retarding property, moisture-resisting property, heat-resisting property and mechanical properties.

The flame-retarding resin composition of the present invention incorporated with the flame-retardant may further be incorporated with a silicone type drip-preventing agent represented by silicone powder, a silicone resin or silicone gum and/or a drip-preventing agent such as tetrafluoroethylene, a scale-like filler, a phenol resin.

In addition to the above ingredients, the flame-retarding rein composition may contain, if necessary, one or more of known conventional auxiliary additives so far as the beneficial effect of the present invention be diminished. Illustrative of such auxiliary additives are, for example, antioxidants (phenol type, phosphine type, and thioether type, etc.), anti-weathering agents (benzophenone type, salicylate type, benzotriazole type, and hindered amine type), metal-inactivating agents, halogen-supplementing agents, lubricating agents (olefins, fatty acid, and derivatives thereof), agents functions as crystallizing nuclei (metal salts, talc, sorbitol type, etc.), fillers (talc, calcium carbonate, barium sulfate, glass filaments and fibers, etc.), anti-blooming agents, anti-blocking agents, haze-preventing agents, sticking agents coloring agents, matting agents, anti-static agents, oxygen- or carbon dioxide-absorbers, gas-absorbers, freshness-keeping agents, enzymes, deodorants and fragrant materials.

In general, the flame-retarding resin composition of the present invention incorporated with the flame-retardant is obtained by dry-mixing the raw materials and then melt-kneading the materials. In this case, no special limitation exists in the means for mixing or blending, the order of mixing the ingredients, and kneading methods. As a means for mixing or blending, for example, a method wherein a tumbler type blender, a V-type blender, a Henshel mixer or ribbon mixer is used is ordinary. Further, no special limitation exists in the method of kneading the mixture, and the method is generally carried out preferably by using a screw extruder, a Banbury mixer, mixing rolls or the like at a temperature higher than the melting point of the thermoplastic resin.

In the aforesaid melt kneading operation, the resin as well as the aliphatic amine salt of a phosphoric ester is molten together and is coated on the surface of the salt of phosphoric and/or polyphosphoric acid to promote its moisture-resisting property. In this case, at least a part of the salt of phosphoric and/or polyphosphoric acid may be mixed, prior to melt kneading, preliminarily with the aliphatic amine salt of a phosphoric ester at a temperature near the melting point of the aliphatic amine salt. It is also possible to conduct this melt kneading operation under a steam of an inert gas such as nitrogen.

Effect of the Invention

As is well understood from the foregoing explanation, the flame-retardant of the present invention is a non-halogen type flame-retardant so that toxicity at the time of combustion is negligible and a thermoplastic resin incorporated with the flame-retardant exhibits stable moisture-resistant property without destroying the moisture-resisting film on molding in addition to exhibiting high flame-retarding property.

The flame-retarding resin composition of the present invention incorporated with the flame-retardant possesses excellent characteristics due to the aforesaid effect; it exhibits not only good moldability but also is the moldings prevented effectively from whitening due to moisture in the air.

Accordingly, the flame-retarding rein composition of the present invention can be utilized for various applications where high flame-retarding property is required, taking advantage of the above characteristics. For example, the flame-retarding rein composition can be utilized, as moldings, for parts and covers of a variety of electric products (washers, refrigerators, dishes-driers, rice-cookers, fans, ventilators, television sets, personal computers, audio-equipments, telephones, electric ranges, warming chamber pots, irons, batteries, etc.); parts and covers for various heating instruments (air-conditioners, stoves, potable cooking stoves, fan heaters, geysers, etc.); internal and external decorative materials for building materials; and parts or internal decorative materials for automobiles, ships and aircraft.

EXAMPLES

The present invention will now be illustrated in more detail by way of Examples and Comparative Examples wherein the measurements and tests were conducted according to the following methods;

(1) Measurement of NMR:

NMR was measured by JNM-GSX270WB (manufactured by Nihon Densi KK, Japan). $^1$H-NMR was measured in DMSO-d6 at bs.Freq. 270.05 MHz, using TMS as standard substance.

(2) Measurement of IR:

IR was measured by Model 1600 (manufactured by Perkin Elmer Corp., U.S.A. using KBr as a tablet into which a test sample had been incorporated.

(3) Molding temperature:

A temperature measured by a resin thermometer annexed to an extruder was determined as the molding temperature.

(4) Test on moldability:

Using a vent-type extruder (HS30 manufactured by Ishinaka Tekkosha, Japan), granulation of the resin composition was carried out for consecutive 3 hours whereby stability at the time of granulation and the state of adhering something to the surface of a screw were observed and evaluated according to the following standard:

○: Granulation was stable and no stain was observed on the surface of screw.

Δ: Some fluctuation on extrusion was observed and slight adhering of something onto the surface of screw was observed.

x: Cutting of strands due to failure of extrusiojn and serious adhesion of something onto the surface of screw and serious scorching were observed.

(5) Test on flame-retarding property:

Using J-50E-P (manufactured by Nihon Seikousho KK, Japan), a test piece of 5'x½'x⅟₁₆' was shaped and flame-retarding property was judged by a perpendicular burning test in accordance with UL94.

(6) Whitening test of moldings:

A test piece of ½ inches in length, ½ inches in width, and ⅛ inch in thickness was allowed to stand for 10 days under the condition of 60° C. in and a humidity of 90%, and then stand for at least 5 hours in a thermostat kept at 23° C. and at a humidity of 60%. Thereafter, the surface was visibly observed to make the following 3-grade evaluation:

○: Never change

Δ: Partially, slight whitening was observed x: Serious whitening was observed (7) Izod impact strength:

The impact strength was measured according to JIS K7110 at 23° C.

The symbols used in Examples and Comparative Examples have the following meanings:

[1] Thermoplastic resin:

PP-1: Ethylene-propylene block copolymer (Tokuyama Polypro PN640G manufactured by KK Tokuyama)

PP-2: Propylene homopolymer (Tokuyama Polypro PN140G manufactured by KK Tokuyama)

HD-1: High density polyethylene (HI-ZEX2200J manufactured by Mitsui Sekiyu kagaku KK)

[2] Aliphatic amine salt of a phosphoric ester:

PIPE-TPA: Piperazine salt of monotolyl phosphate prepared according to the following procedure:

A 50% cresol/methylene chloride solution was added dropwise to a 10% phosphorus pentoxide/methylene chloride suspension under agitation and the mixture was refluxed for 5 hours. The methylene chloride was distilled off and ice water in an amount of 10 times as much as the resultant reaction product was added. A 10% aqueous solution of piperazine was added dropwise to the mixture and, at the time of adding ½ equivalent, the formed precipitate was collected by filtration, dried and pulverized in a laboratory mill. An NMR measurement of the product revealed that $^1$H chemical shift of the methylene in piperazine was shifted to ppm lower magnetic field while $^{31}$P chemical shift was shifted to ppm higher magnetic field, thus confirming the formation of salt.

Below are results of IR-spectrography and NMR-spectrography:

IR: 3300-2500 cm$^{-1}$ (m), 1593 cm$^{-1}$, 1490 cm$^{-1}$, 1257 cm$^{-1}$, 1201 cm$^{-1}$, 1089 cm$^{-1}$, 1069 cm$^{-1}$, 920 cm$^{-1}$, 903 cm$^{-1}$, 892 cm$^{-1}$, 786 cm$^{-1}$; 1H-NMR (DMSO-d6): δ=3.50 ppm (s, 8H), 7.0–7.4 ppm (m, 5H); $^{31}$P-NMR (DMSO): δ=–6.88 ppm.

PIPE-PPA: Piperazine salt of monophenyl phosphate prepared according to the following procedure:

A 50% phenol/methylene chloride solution was added dropwise to a 10% phosphorus pentoxide/methylene chloride suspension under agitation and the mixture was refluxed for 5 hours. The methylene chloride was distilled off and ice water in an amount of 10 times as much as the resultant reaction product was added. A 10% aqueous solution of piperazine was added dropwise to the mixture and, at the time of adding ½ equivalent, the formed precipitate was collected by filtration, dried and pulverized in a laboratory mill. An NMR measurement of the product revealed that $^1$H chemical shift of the methylene in piperazine was shifted to ppm lower magnetic field while $^{31}$P chemical shift was shifted to ppm higher magnetic field, thus confirming the formation of salt.

Below are results of IR-spectrography and NMR-spectrography:

IR (KBr): 3200-2500 cm$^{-1}$ (m), 1508 cm$^{-1}$, 1231 cm$^{-1}$, 1215 cm$^{-1}$, 1105 cm$^{-1}$1080 cm$^{-1}$, 919 cm$^{-1}$, 828 cm$^{-1}$; 1H-NMR (DMSO-d6): δ=2.34 ppm (s, 3H), 3.50 ppm (s, 8H), 7.0–7.4 ppm (m, 4H); $^{31}$P-NMR (DMSO): δ=6.52 ppm.

[3] Phosphoric acid derivative having an aryl group:

TPP: Triphenyl phosphate (manufactured by Wako Junyaku Kogyo KK, Japan)

EDA-PPOA: Ethylenediamine salt of phenylphosphonate prepared according to the following procedure:

A 10% aqueous solution of ethylenediamine was added dropwise to a 10% aqueous solution of phenyl phosphonate under agitation, and at the time of adding ½ equivalent, the formed precipitate was collected by filtration, dried, and pulverized in a laboratory mil.

[4] A salt of polyphosphoric acid:

APP-1: Ammonium polyphosphate (AP422 manufactured by Clariant (sic.), Japan KK)

APP-2: Melamine coated ammonium polyphosphate (TERAJU C-60 manufactured by Chisso KK, Japan)

EDA-PA: Melamine coated ethylenediamine phosphate (Amgard NL manufactured by Albright & Wilson Ltd.)

[5] The nitrogen-containing compound having triazine skeleton:

MA-PA: Melamine phosphate prepared according to the following procedure:

A 5% hot aqueous solution of melamine was added with stirring to a 30% aqueous solution of 1 equivalent phosphoric acid, and the formed precipitate was collected by filtration, dried and pulverized in a laboratory mill.

EXAMPLES 1–14

The thermoplastic resin and the flame-retardant in a proportion shown in Table 1 were granulated, molded and evaluated for moldability.

Using a Henshel mixer for preliminary blending, the the granulation operation was carried out in the following manner: Using a vent-type extruder of 30 mmΦ, the resultant flame-retarding resin composition was extruded at a cylinder temperature of 190° C. into strands which were cooled in a water tank, cut to have a length of 5 mm, dried to form pellets. Next, the pellets were molded by the aid of a 50 ton injection molding machine into various test pieces.

Each resin composition was subjected to a burning test and a moisture-resisting test. Table 2 shows a result of the tests.

TABLE 1

| Example | Poly-olefin (parts*) | | (a) (parts*) | | Flame-retardant (b) (parts*) | | (c) (parts*) | | (a)/(b) | (a) M.P. (° C.) | Molding temp. (° C.) |
|---|---|---|---|---|---|---|---|---|---|---|---|
| 1 | PP-1 | 100 | PIPE-TPA | 45 | APP-1 | 22 | — | | 2/1 | 207 | 215 |
| 2 | PP-1 | 100 | PIPE-PPA | 45 | APP-1 | 22 | — | | 2/1 | 202 | 215 |
| 3 | PP-1 | 100 | PIPE-TPA | 45 | EDA-PA | 22 | — | | 2/1 | 207 | 215 |
| 4 | PP-1 | 100 | PIPE-TPA | 45 | APP-2 | 22 | — | | 2/1 | 207 | 215 |
| 5 | PP-1 | 100 | PIPE-TPA | 35 | APP-1 | 35 | — | | 1/1 | 207 | 215 |
| 6 | PP-2 | 100 | PIPE-TPA | 45 | APP-1 | 22 | — | | 2/1 | 207 | 215 |
| 7 | HD-1 | 100 | PIPE-TPA | 45 | APP-1 | 22 | — | | 1/1 | 207 | 215 |
| 8 | PP-1 | 100 | PIPE-TPA | 22 | APP-1 | 11 | MA-PA | 11 | 2/1 | 207 | 215 |
| 9 | PP-1 | 100 | PIPE-PPA | 22 | APP-1 | 11 | MA-PA | 11 | 2/1 | 202 | 215 |
| 10 | PP-1 | 100 | PIPE-TPA | 22 | EDA-PA | 11 | MA-PA | 11 | 2/1 | 207 | 215 |
| 11 | PP-1 | 100 | PIPE-TPA | 22 | APP-2 | 11 | MA-PA | 11 | 2/1 | 207 | 215 |
| 12 | PP-1 | 100 | PIPE-TPA | 16 | APP-1 | 16 | MA-PA | 11 | 1/1 | 207 | 215 |
| 13 | PP-2 | 100 | PIPE-TPA | 22 | APP-1 | 11 | MA-PA | 11 | 2/1 | 207 | 215 |
| 14 | HD-1 | 100 | PIPE-TPA | 22 | APP-1 | 11 | MA-PA | 11 | 2/1 | 207 | 215 |
| 15 | PP-1 | 100 | PIPE-TPA | 18 | APP-1 | 9 | MA-PA | 9 | 2/1 | 207 | 215 |
| 16 | PP-1 | 100 | PIPE-PPA | 18 | APP-1 | 9 | MA-PA | 9 | 2/1 | 202 | 215 |
| 17 | PP-1 | 100 | PIPE-TPA | 18 | EDA-PA | 9 | MA-PA | 9 | 2/1 | 207 | 215 |
| 18 | PP-1 | 100 | PIPE-TPA | 18 | APP-2 | 9 | MA-PA | 9 | 2/1 | 207 | 215 |
| 19 | PP-1 | 100 | PIPE-TPA | 14 | APP-1 | 14 | MA-PA | 9 | 1/1 | 207 | 215 |
| 20 | PP-2 | 100 | PIPE-TPA | 18 | APP-1 | 9 | MA-PA | 9 | 2/1 | 207 | 215 |
| 21 | HD-1 | 100 | PIPE-TPA | 18 | APP-1 | 9 | MA-PA | 9 | 2/1 | 207 | 215 |

Remarks:
*All parts are shown by weight.
"Molding temp." means molding temperature.
(a) stands for the aliphatic amine salt of a phosphoric ester.
(b) stands for the salt of (poly)phosphoric acid.
(c) stands for the nitrogen-containing compound having a triazine skeleton.
The unit of (a)/(b) is shown by weight ratio.

TABLE 2

| Example | Moldability | Flame-retarding property (1/16 inch) | moisture-resisting Property | Izod impact value |
|---|---|---|---|---|
| 1 | ◯ | V-0 | ◯ | 2.5 kJ/m$^2$ |
| 2 | ◯ | V-0 | ◯ | 2.5 kJ/m$^2$ |
| 3 | ◯ | V-0 | ◯ | 2.4 kJ/m$^2$ |
| 4 | ◯ | V-0 | ◯ | 2.3 kJ/m$^2$ |
| 5 | ◯ | V-0 | ◯ | 2.1 kJ/m$^2$ |
| 6 | ◯ | V-0 | ◯ | 1.8 kJ/m$^2$ |
| 7 | ◯ | V-0 | ◯ | 1.6 kJ/m$^2$ |
| 8 | ◯ | V-0 | ◯ | 5.5 kJ/m$^2$ |
| 9 | ◯ | V-0 | ◯ | 5.3 kJ/m$^2$ |
| 10 | ◯ | V-0 | ◯ | 5.0 kJ/m$^2$ |
| 11 | ◯ | V-0 | ◯ | 4.2 kJ/m$^2$ |
| 12 | ◯ | V-0 | ◯ | 5.0 kJ/m$^2$ |
| 13 | ◯ | V-0 | ◯ | 3.1 kJ/m$^2$ |
| 14 | ◯ | V-0 | ◯ | 2.7 kJ/m$^2$ |

As shown in Examples 1–14, the flame-retarding rein compositions possess high flame-retarding property (1/16 inch V-0) and moisture-resisting property.

In Examples 8–14 where the resin composition had been incorporated with the nitrogen-containing compound having a triazine skeleton, a result of 1/16 inch V-0 was attained and Izod impact strength was increased with a more reduced amount as compared with Examples 1–7.

Comparative Examples 1–7

An operation was carried out in the same manner as in Example 1 except that the composition of the flame-retardant to be incorporated into the thermoplastic resin was changed to that of Comparative Example 1–7 shown in Table 3. A result of the test was shown in Table 4.

TABLE 3

| Comp. Example | Poly-olefin (parts*) | | (a) (parts*) | | Flame-retardant (b) (parts*) | | (c) (parts*) | (a)/(b) | (a) M.P. (° C.) | Molding temp. (° C.) |
|---|---|---|---|---|---|---|---|---|---|---|
| 1 | PP-1 | 100 | PIPE-TPA | 65 | — | | — | — | 207 | 215 |
| 2 | PP-1 | 100 | — | | APP-1 | 65 | — | — | — | 215 |
| 3 | PP-1 | 100 | — | | APP-2 | 65 | — | — | — | 215 |
| 4 | PP-1 | 100 | PIPE-TPA | 11 | APP-1 | 55 | — | 1/5 | 207 | 215 |
| 5 | PP-1 | 100 | PIPE-TPA | 35 | APP-1 | 3.5 | — | 10/1 | 207 | 215 |
| 6 | PP-1 | 100 | TPP | 45 | APP-1 | 22 | — | 2/1 | 49 | 215 |

TABLE 3-continued

| Comp. Example | Polyolefin (parts*) | | (a) (parts*) | | Flame-retardant (b) (parts*) | | (c) (parts*) | (a)/(b) | (a) M.P. (° C.) | Molding temp. (° C.) |
|---|---|---|---|---|---|---|---|---|---|---|
| 7 | PP-1 | 100 | EDA-PPOA | 45 | APP-1 | 22 | — | 2/1 | 319** | 215 |
| 8 | PP-1 | 100 | — | | APP-1 | 85 | — | — | — | 215 |

Remarks:
*All parts are shown by weight. **with decomposition
"Comp. Example" means Comparative Example
"Molding temp." means molding temperature.
(a) stands for the aliphatic amine salt of a phosphoric ester.
(b) stands for the salt of (poly)phosphoric acid.
(c) stands for the nitrogen-containing compound having a triazine skeleton.
The unit of (a)/(b) is shown by weight ratio.

TABLE 4

| Comp. Example | Moldability test | Flame-retarding property test (1/16 inch) | Whitening test of the moldings | Izod impact value |
|---|---|---|---|---|
| 1 | ◯ | HB | ◯ | 2.7 kJ/m² |
| 2 | ◯ | V-0 | X | 2.0 kJ/m² |
| 3 | ◯ | V-0 | Δ | 1.9 kJ/m² |
| 4 | ◯ | V-0 | Δ | 2.1 kJ/m² |
| 5 | ◯ | HB | ◯ | 2.7 kJ/m² |
| 6 | X(*1) | V-2 | X(*2) | 2.0 kJ/m² |
| 7 | ◯ | V-0 | X | 2.0 kJ/m² |
| 8 | X | V-0 | X | 1.9 kJ/m² |

Remarks:
(*1) Granulation is difficult due to bad dispersion.
(*2) Almost half of triphenyl phosphate are seemingly bled out.

In case the polyphosphoric acid salt was never incorporated (Comparative Example 1) or in case the proportion of the polyphosphoric acid salt is less than 1/5 of the proportion of the amine salt of a phosphoric ester (Comparative Example 5), it was difficult to obtain flame-retarding property of 1/16 inch V-0.

On the other hand, in case the phosphoric acid salt was never incorporated (Comparative Examples 2 and 3) or in case the proportion of the amine salt of a phosphoric ester is less than ½ of the proportion of the polyphosphoric acid salt (Comparative Example 4), a satisfactory moisture-resisting property could not be obtained so that whitening took place in the moldings.

In case triphenyl phosphate having a melting point of not higher than 100° C. was incorporated in place of the amine salt of a phosphoric ester (Comparative Example 6), the flame-retardant was hardly dispersible in the extruder so that granulation was difficult and not only was stain of metal mold generated at the time of molding but also triphenyl phosphate seemingly supposed was bled out.

In the event ethylenediamine salt of phenyl phosphonate was incorporated in place of the amine salt of a phosphoric ester (Comparative Example 7), no improvement was found in moisture-resisting property of the polyphosphoric acid salt, possibly due to the fact that the ethyelendiamine salt of phenyl phosphonate was not molten at the time of molding.

It is understood that the preceding representative examples may be varied with the scope of the present specification both as to components and conditions, by one skilled in the art to achieve essentially the same results.

As many widely different embodiments of the present invention may be made without departing from the spirit and scope thereof, it is t be construed that the present invention is not limited to the specific embodiments thereof except as defined in the appended claims.

What is claimed is:

1. A flame-retardant which comprises (a) an aliphatic amine salt of a phosphoric ester with 2–25 carbon atoms in the ester moiety thereof having a melting point of at least 100° C. but not more than a molding temperature of a thermoplastic resin to be used and (b) a salt of phosphoric and/or polyphosphoric acid, the proportion of the component (a) to the component (b), i.e. (a)/(b) being 1/2–5/1 by weight ratio.

2. A flame-retardant according to claim 1, wherein 10–100 parts by weight of (c) a nitrogen-containing compound having a triazine skeleton is contained per 100 parts by weight of a total amount of the component (a) and the component (b).

3. A flame-retardant according to claims 1 or 2, wherein the component ()b) is ammonium polyphosphate.

4. A flame-retardant according to claim 3, wherein the component (a) is an aliphatic amine salt of an aromatic phosphoric monoester.

5. A flame-retardant according to claim 3, wherein the component (a) is an aliphatic secondary polyamine of an aromatic phosphoric monoester.

6. A flame-retardant according to claim 1, wherein the component (a) is piperazine salt of monophenyl phosphate or piperazine salt of monotolyl phosphate.

7. A flame-retarding resin composition which comprises 100 parts by weight of a thermoplastic resin incorporated with 15–150 parts by weight of the flame-retardant according to claim 1.

8. A flame-retarding resin composition which comprises 100 parts by weight of a thermoplastic resin incorporated with 15–100 parts by weight of the flame-retardant according to claim 2.

9. A flame-retardant which comprises (a) an aliphatic amine salt of a phosphoric ester with 2–25 carbon atoms in the ester moiety thereof having a melting point of at least 100° C. but not more than a molding temperature of a thermoplastic resin to be used and (b) a salt of a phosphoric and/or polyphosphoric acid, the proportion of the component (a) to the component (b), i.e., (a)/(b) being 1/2–5/1 by weight ratio;

wherein the component (a) is piperazine salt of monophenyl phosphate or piperazine salt of a monotolyl phosphate.

10. A flame-retarding resin composition which comprises 100 parts by weight of a thermoplastic resin incorporated with 15–100 parts by weight of the flame-retardant to claim 9.

* * * * *